(12) United States Patent
Fu et al.

(10) Patent No.: US 8,670,250 B2
(45) Date of Patent: Mar. 11, 2014

(54) COMMON MODE NOISE REDUCTION APPARATUS AND METHOD

(75) Inventors: Dianbo Fu, Plano, TX (US); Hengchun Mao, Plano, TX (US); Bing Cai, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 270 days.

(21) Appl. No.: 13/219,476

(22) Filed: Aug. 26, 2011

(65) Prior Publication Data

US 2012/0063173 A1 Mar. 15, 2012

Related U.S. Application Data

(60) Provisional application No. 61/382,229, filed on Sep. 13, 2010.

(51) Int. Cl.
*H02J 1/02* (2006.01)

(52) U.S. Cl.
USPC .......................................................... 363/39

(58) Field of Classification Search
USPC .................................... 363/39, 44, 45, 47, 48
See application file for complete search history.

(56) References Cited

U.S. PATENT DOCUMENTS

| | | |
|---|---|---|
| 6,850,423 B2 | 2/2005 | Lanni |
| 7,030,689 B2 | 4/2006 | Leenerts et al. |
| 2007/0171585 A1 | 7/2007 | Sicong et al. |
| 2008/0061748 A1 | 3/2008 | Wang et al. |

OTHER PUBLICATIONS

Wang, S. et al., "Common Mode Noise Reduction for Boost Converters Using General Balance Technique," IEEE Transactions on Power Electronics, vol. 22, No. 4, Jul. 2007, pp. 1410-1416.
Fu, D. et al., "Novel Techniques to Suppress the Common Mode EMI Noise Cause by Transformer Parasitic Capacitances in DC-DC Converters," IEEE, 2010, pp. 1252-1259.
International Search Report, PCT/US2011/051413, Date of Mailing Jan. 6, 2012, 10 pages.
Zhang, Y.F., et al., "Spectral Analysis and EMI Comparison of PWM, Quasi-Resonant, and Resonant Converters," Circuits and Systems, Proceeding of the 37th Midwest, 1994, vol. 2, pp. 1285-1288.
Yang, B., et al., "LLC Resonant Converter for Front End DC/DC Conversion," Applied Power Electronics Conference and Exposition, 2002, vol. 2, pp. 1108-1112.
Lu, B., et al., "Optimal Design Methodology for LLC Resonant Converter," Applied Power Electronics Conference and Exposition, 2006, pp. 533-538.

(Continued)

*Primary Examiner* — Harry Behm
*Assistant Examiner* — Matthew Grubb
(74) *Attorney, Agent, or Firm* — Slater & Matsil, L.L.P.

(57) ABSTRACT

An embodiment common mode noise reduction apparatus comprises a common mode choke, a balance inductor, a first capacitor and a second capacitor. The common mode choke is placed between an input dc source and a primary side network of an isolated power converter. The balance inductor is coupled between an upper terminal of a primary winding of the isolated power converter and a negative terminal of the input dc source. The first capacitor is coupled between the upper terminal of a primary side of a transformer and an upper terminal of a secondary side of the transformer of the isolated power converter. The second capacitor is coupled between a lower terminal of the primary side of the transformer and a lower terminal of the secondary side of the transformer of the isolated power converter.

20 Claims, 13 Drawing Sheets

(56) References Cited

OTHER PUBLICATIONS

Wang, S., et al., "Inductor Winding Capacitance Cancellation Using Mutual Capacitance Concept for Noise Reduction Application," IEEE Transactions on Electromagnetic Compatibility, May 2006, vol. 48, No. 2, pp. 311-318.

Lin, S., et al., "Novel Methods to Reduce Common-mode Noise Based on Noise Balance," 37th IEEE Power Electronics Specialists Conference, Jun. 18-22, 2006, Jeju, Korea, pp. 2728-2733.

Wang, S., "Design of Inductor Winding Capacitance Cancellation for EMI Suppression," IEEE Transaction on Power Electronics, vol. 21, No. 6, Nov. 2006, pp. 1825-1832.

Fu, D., et al., "1MHz High Efficiency LLC Resonant Converters with Synchronous Rectifier," Power Electronics Specialists Conference, 2007, pp. 2404-2410.

Wang, S., "Common Mode Noise Reduction for Boost Converters Using General Balance Technique," IEEE Transactions on Power Electronics, Jul. 2007, vol. 22, No. 4, pp. 1410-1416.

Wang, S., "Common-Mode Noise Reduction for Power Factor Correction Circuit With Parasitic Capacitance Cancellation," Aug. 2007, vol. 49, No. 3, pp. 537-542.

Kong, P., "Common Mode EMI Noise Suppression for Bridgeless PFC Converters," IEEE Transactions on Power Electronics, Jan. 2008, vol. 23, No. 1, pp. 291-297.

COMMON MODE NOISE REDUCTION APPARATUS AND METHOD

This application claims the benefit of U.S. Provisional Application No. 61/382,229, filed on Sep. 13, 2010, entitled "Novel EMI Reduction Techniques for DC-DC Converters," which application is hereby incorporated herein by reference.

TECHNICAL FIELD

The present invention relates to a common mode noise reduction apparatus and method for power converters, and more particularly, to a common mode noise reduction apparatus and method for a series parallel resonant converter.

BACKGROUND

A telecommunication network power system usually includes an ac-dc stage converting the power from the ac utility line to a 48V dc distribution bus and a dc/dc stage converting the 48V dc distribution bus to a plurality of voltage levels for all types of telecommunication loads. A conventional ac-dc stage may comprise a variety of EMI filters, a bridge rectifier formed by four diodes, a power factor correction circuit and an isolated dc/dc power converter. The dc/dc stage may comprise a plurality of isolated dc/dc converters. Isolated dc/dc converters can be implemented by using different power topologies, such as LLC resonant converters, flyback converters, forward converters, half bridge converters, full bridge converters and the like.

In a telecommunication network power system, isolated dc/dc converters may generate common mode noise. More particularly, an isolated dc/dc converter may comprise at least one primary side switch to chop an input dc voltage so as to generate an ac voltage across the primary side of a transformer. In order to achieve a compact solution, the isolated dc/dc converter may operate at a high switching frequency such as 1 MHz. Such a high switching frequency may generate a high and fast voltage swing across the primary side. Furthermore, there may be a plurality of parasitic capacitors coupled between the primary side and the secondary side of the transformer. The high frequency voltage swing and the parasitic capacitors lead to common mode noise in an isolated dc/dc converter because the parasitic capacitors of the transformer provide a low impedance conductive path for common mode current derived from the high frequency voltage swing.

In order to control the electromagnetic interference (EMI) pollution from common mode noise, a variety of international standards have been introduced. For example, EMI standard EN55022 Class B is applicable to isolated dc/dc converters. In accordance with a conventional technique, a common mode choke may be employed to attenuate common mode noise. The common mode choke may be placed between an input dc voltage source and the primary side switching network of an isolated dc/dc converter. The common mode chock can pass the dc current from the input dc source while blocking the common mode current generated from the primary side switching network. However, an effective common mode choke may be of a large inductance value, which may require a big and expensive coil. Such a big and expensive coil may increase the size of the isolated dc/dc converter, introduce extra cost and degrade the efficiency of the isolated dc/dc converter as well.

SUMMARY OF THE INVENTION

These and other problems are generally solved or circumvented, and technical advantages are generally achieved, by preferred embodiments of the present invention which provide an apparatus and method for reducing common mode noise in an isolated power converter.

In accordance with an embodiment, an apparatus comprises a common mode choke, a balance inductor, a first capacitor and a second capacitor. The common mode choke is disposed between an input dc source and a primary side network of an isolated power converter. The balance inductor is coupled between an upper terminal of a primary winding of the isolated power converter and a negative terminal of the input dc source. The first capacitor is coupled between the upper terminal of a primary side of a transformer and an upper terminal of a secondary side of the transformer of the isolated power converter. The second capacitor is coupled between a lower terminal of the primary side of the transformer and a lower terminal of the secondary side of the transformer of the isolated power converter.

In accordance with another embodiment, a system comprises an isolated power converter and a balanced impedance network. The isolated power converter comprises a primary side network coupled to an input dc source, a transformer coupled to the primary side network, a rectifier coupled to a secondary side of the transformer and an output filter coupled to the rectifier.

The balanced impedance network comprises a common mode choke, a balance inductor, a first capacitor and a second capacitor. The common mode choke is disposed between the input dc source and the primary side network of the isolated power converter. The balance inductor is coupled between an upper terminal of a primary side of the transformer of the isolated power converter and a negative terminal of the input dc source. The first capacitor is coupled between the upper terminal of the primary side of the transformer and an upper terminal of the secondary side of the transformer of the isolated power converter. The second capacitor is coupled between a lower terminal of the primary side of the transformer and a lower terminal of the secondary side of the transformer of the isolated power converter.

In accordance with yet another embodiment, a method comprises determining a first capacitance value of a first parasitic capacitor coupled between an upper terminal of a primary side of a transformer and an upper terminal of a secondary side of the transformer of an isolated power converter, determining a second capacitance value of a second parasitic capacitor coupled between a lower terminal of the primary side of the transformer and a lower terminal of the secondary side of the transformer of the isolated power converter, determining a inductance value of a common mode choke coupled between the primary side of the transformer and an input dc source and coupling a balance inductor between the upper terminal of the primary side of the transformer and a negative terminal of the input dc source. An inductance value of the balance inductor is configured such that a ratio between the inductance value of the balance inductor and the inductance value of the common mode choke is equal to a ratio between the first capacitance value and the second capacitance value.

An advantage of an embodiment of the present invention is reducing common mode noise of an isolated power converter so as to improve the efficiency, reliability and cost of the isolated power converter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a common mode noise reduction apparatus of a series parallel resonant converter. Throughout the description, the series parallel converter is alternatively referred to as an LLC resonant converter since the series parallel converter is commonly known as an LLC resonant converter. The invention may also be applied, however, to a variety of isolated power converters including half bridge converters, full bridge converters, flyback converters, forward converters, push-pull converters and the like. Furthermore, the invention may also be applied to a variety of power factor correction circuits.

Figure 1:
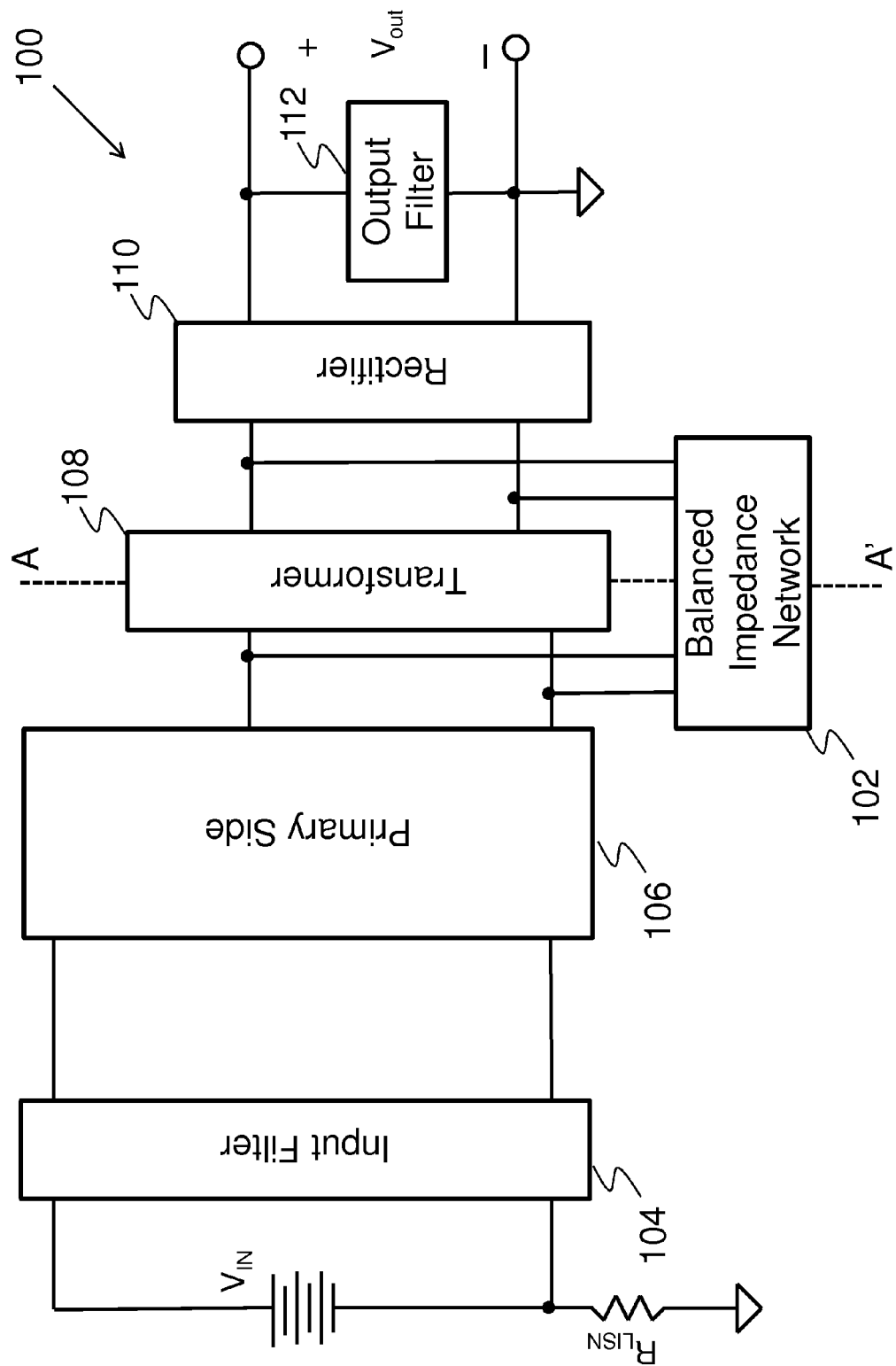
FIG. 1 illustrates a block diagram of an isolated dc/dc converter having a balanced impedance network in accordance with an embodiment.

Referring initially to FIG. 1, a block diagram of an isolated dc/dc converter having a balanced impedance network is illustrated in accordance with an embodiment. The isolated dc/dc converter 100 comprises an input filter 104, a primary side network 106, a transformer 108, a rectifier 110 and an output filter 112. In addition, a balanced impedance network 102 is placed between the primary side and the secondary side of the isolated dc/dc converter 100. It should be noted that as indicated by a dashed line A-A', the left side of the dashed line including the input dc source $V_{IN}$, the input filter 104 and the primary side network 106 is commonly referred to as the primary side of the isolated dc/dc converter 100. On the other hand, the right side of the dashed line A-A' including the rectifier 110 and the output filter 112 is commonly referred to as the secondary side of the isolated dc/dc converter 100. Furthermore, as shown in FIG. 1, the transformer 108 is placed between the primary side and the second side. In fact, the transformer 108 provides electrical isolation between the primary side and the secondary side of the isolated dc/dc converter 100.

FIG. 1 shows the primary side network 106 is coupled to the input dc source $V_{IN}$ through the input filter 104. Depending on different power converter topologies, the primary side network 106 may comprise different combinations of switches as well as passive components. For example, the primary side network 106 may comprise four switching elements connected in a bridge configuration when the isolated dc/dc converter 100 is a full bridge power converter. On the other hand, when the isolated dc/dc converter 100 is an LLC resonant converter, the primary side network 106 may comprise a high side switching element and a low side switching element connected in series, and a resonant tank formed by an inductor and a capacitor connected in series. One of ordinary of skill in the art will realize that the isolated dc/dc converter 100 as well as its corresponding primary side network 106 may be implemented in many different ways. It should be noted that the power converter topologies discussed herein are provided for illustrative purposes only, and are provided only as examples of various embodiments.

The input filter 104 may comprise a common mode choke. The common mode choke provides high impedance when common mode noise tries to flow out of both the positive terminal and the negative terminal of the primary side network at the same time. As a result, the common mode noise of the isolated dc/dc converter 100 may be prevented from passing through the input filter 104. The structure and operation of common mode chokes are well known in the art, and hence are not discussed in further detail.

The transformer 108 provides electrical isolation between the primary side and the secondary side of the isolated dc/dc converter 100. In accordance with an embodiment, the transformer 108 may be formed of two transformer windings, namely a primary transformer winding and a secondary transformer winding. Alternatively, the transformer 108 may have a center tapped secondary so as to have three transformer windings including a primary transformer winding, a first secondary transformer winding and a second secondary transformer winding. It should be noted that the transformers illustrated herein and throughout the description are merely examples, which should not unduly limit the scope of the claims. One of ordinary skill in the art would recognize many variations, alternatives, and modifications. For example, the transformer 108 may further comprise a variety of bias windings and gate drive auxiliary windings.

The rectifier 110 converts an alternating polarity waveform received from the output of the transformer 108 to a single polarity waveform. The rectifier 110 may be formed of a pair of switching elements such as NMOS transistors. Alternatively, the rectifier 110 may be formed of a pair of diodes. The detailed operation and structure of the rectifier 110 are well known in the art, and hence are not discussed herein.

The output filter 112 is used to attenuate the switching ripple of the isolated dc/dc converter 100. According to the operation principles of isolated dc/dc converters, the output filter 112 may be an L-C filter formed by an inductor and a capacitor. Alternatively, output filter 112 may be formed of a capacitor. One person skilled in the art will recognize that some isolated dc/dc converter topologies such as forward converters may require an L-C filter. On the other hand, some isolated dc/dc converter topologies such as LLC resonant converters may include an output filter formed by a capacitor. One person skilled in the art will recognize that different output filter configurations apply to different power converter topologies as appropriate. The configuration variations of the output filter 112 are within various embodiments of the present disclosure.

FIG. 1 further illustrates a line impedance network (LISN) connected between the negative terminal of the input dc source $V_{IN}$ and ground. In accordance with an embodiment, the LISN is a 25 Ohm resistor, which is used to measure the common mode noise of the isolated dc/dc converter 100. It should be noted that while FIG. 1 shows a single LISN resistor $R_{LISN}$, the LISN can be implemented by using two resistors connected between the positive terminal and the negative terminal of the input dc source $V_{IN}$. In particular, two 50 Ohm resistors are connected in series. The joint node of these two resistors is connected to ground and the other two terminals are connected to the positive and negative terminals of the input dc source $V_{IN}$ respectively.

FIG. 1 further illustrates a balanced impedance network 102 coupled between the primary side and the secondary side of the isolated dc/dc converter 100. More particularly, the balanced impedance network 102 has two terminals coupled to the two terminals of the secondary side of the transformer 108 respectively. In addition, the balanced impedance network 102 has the other two terminals coupled to the two terminals of the primary side of the transformer 108 respectively. The balanced impedance network 102 functions as a Wheatstone bridge. When the Wheatstone bridge is balanced, the voltage across the Wheatstone bridge is zero. As such, by selecting appropriate values for each elements of the balanced impedance network 102, the common mode noise of the isolated dc/dc converter 100 may be equal to zero. The detailed operation of the balanced impedance network 102 will be described below with respect to FIGS. 2 and 3.

Figure 2:
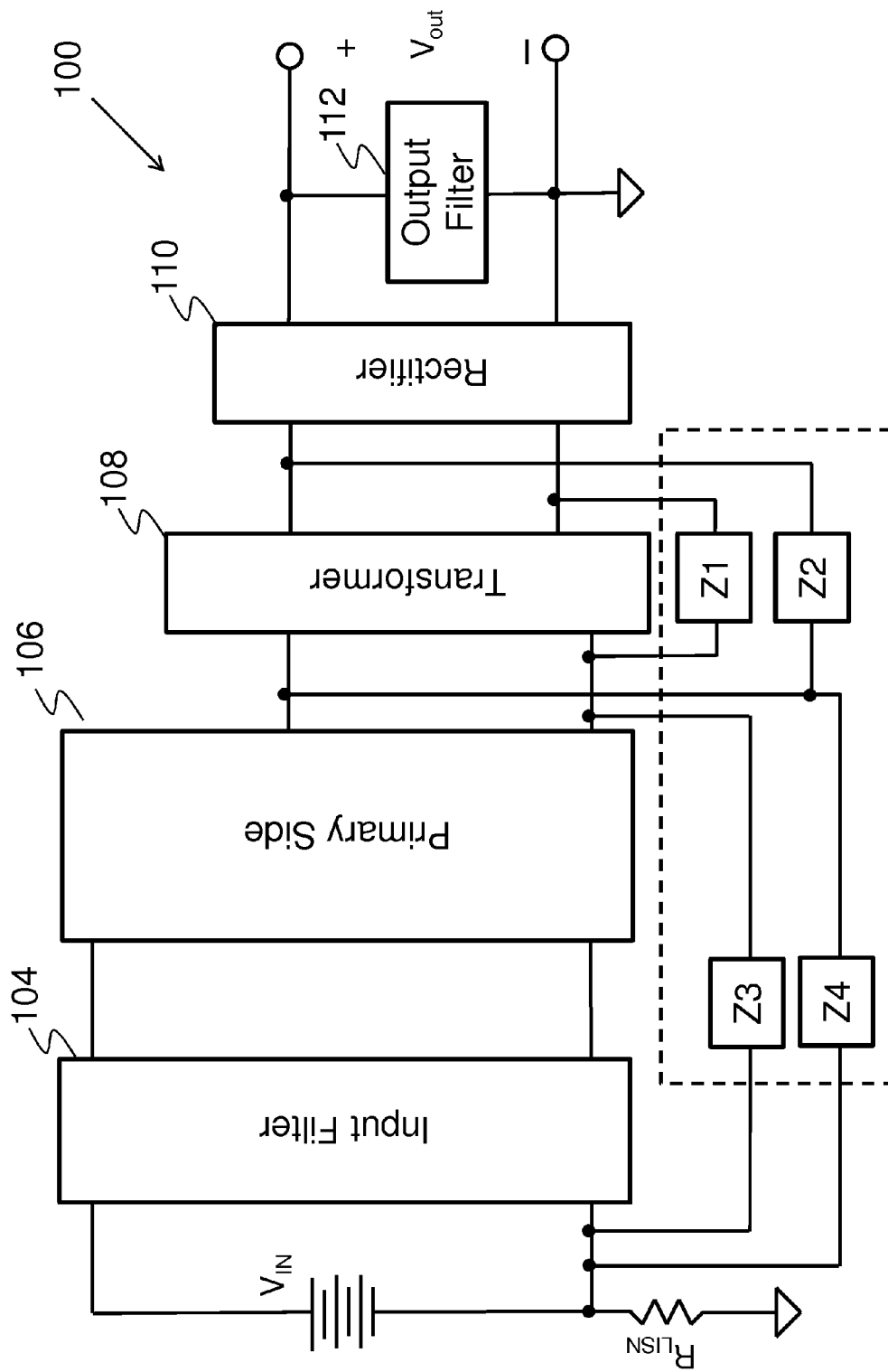
FIG. 2 illustrates a block diagram of the balanced impedance network and the isolated dc/dc converter in accordance with an embodiment.

FIG. 2 illustrates a block diagram of the balanced impedance network 102 and the isolated dc/dc converter 100 in accordance with an embodiment. As shown in FIG. 2, the balanced impedance network 102 may comprise four components, namely Z1, Z2, Z3 and Z4. In accordance with an embodiment, Z1 and Z2 may be two parasitic capacitors from the transformer 108. Z3 is an equivalent inductor derived from the input filter 104. Z4 may be an extra inductor. Such an extra inductor may be a separate inductor or magnetically coupled with the input filter 104. An advantageous feature of having an extra inductor Z4 is that a balanced Wheatstone bridge may be formed so that the common mode noise of the isolated dc/dc converter 100 may be attenuated accordingly.

Figure 3:
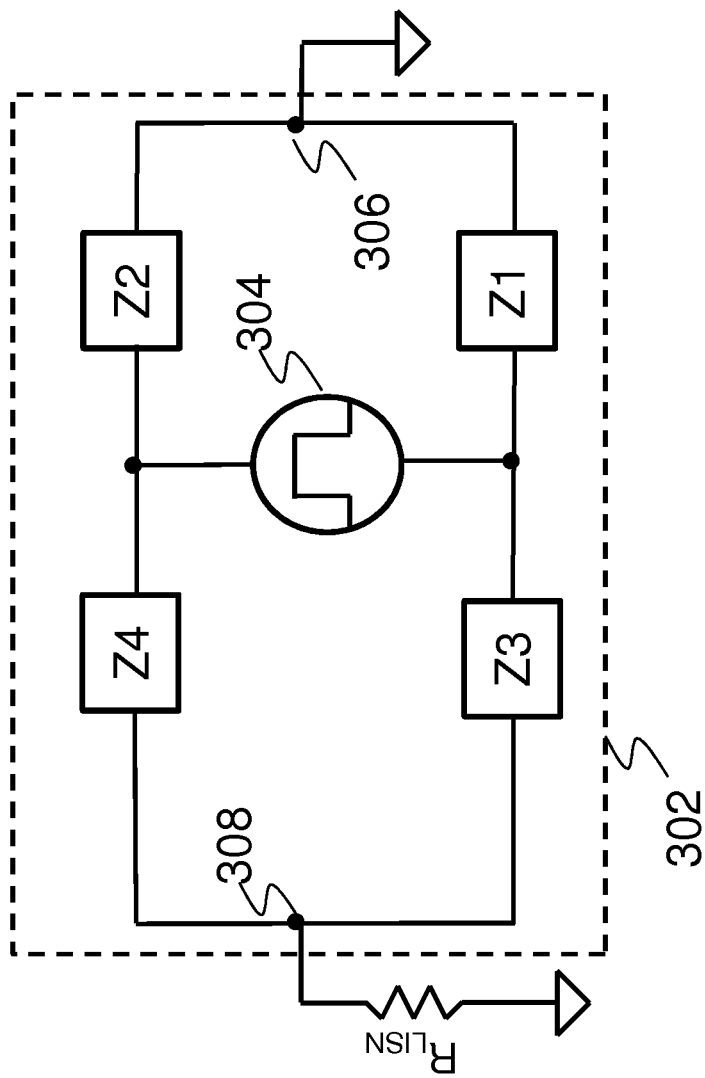
FIG. 3 illustrates an equivalent circuit of the isolated dc/dc converter and the balanced impedance network in accordance with an embodiment.

FIG. 3 illustrates an equivalent circuit of the isolated dc/dc converter and the balanced impedance network in accordance with an embodiment. The majority of the isolated dc/dc converter 100 shown in FIG. 2 may be omitted from the equivalent circuit 302 in consideration with the common mode noise generation. Therefore, the isolated dc/dc converter 100 may be simplified into an ac source 304 coupled between a first joint node between Z4 and Z2, and a second joint node between Z3 and Z1.

As shown in FIG. 3, the equivalent circuit 302 is a Wheatstone bridge. According to the operation of Wheatstone bridges, the voltage across a point 306 and a point 308 is zero if a ratio between Z4 and Z3 is equal to a ratio between Z2 and Z1. Therefore, by selecting an appropriate value for each component of the Wheatstone bridge shown in FIG. 3, the voltage across the point 306 and the point 308 can be zero. Furthermore, the point 306 is coupled to ground. Therefore, the voltage at the point 308 is approximately equal to zero. As such, the common mode noise measurement across the LISN resistor $R_{LISN}$ is close to zero. An advantageous feature of having the balanced impedance network is that the ac source 304 is constrained by the balanced impedance network so that the common mode noise derived from the ac source 304 is prevent from polluting circuits outside the isolated dc/dc converter 100 (not shown but illustrated in FIG. 2).

Figure 4:
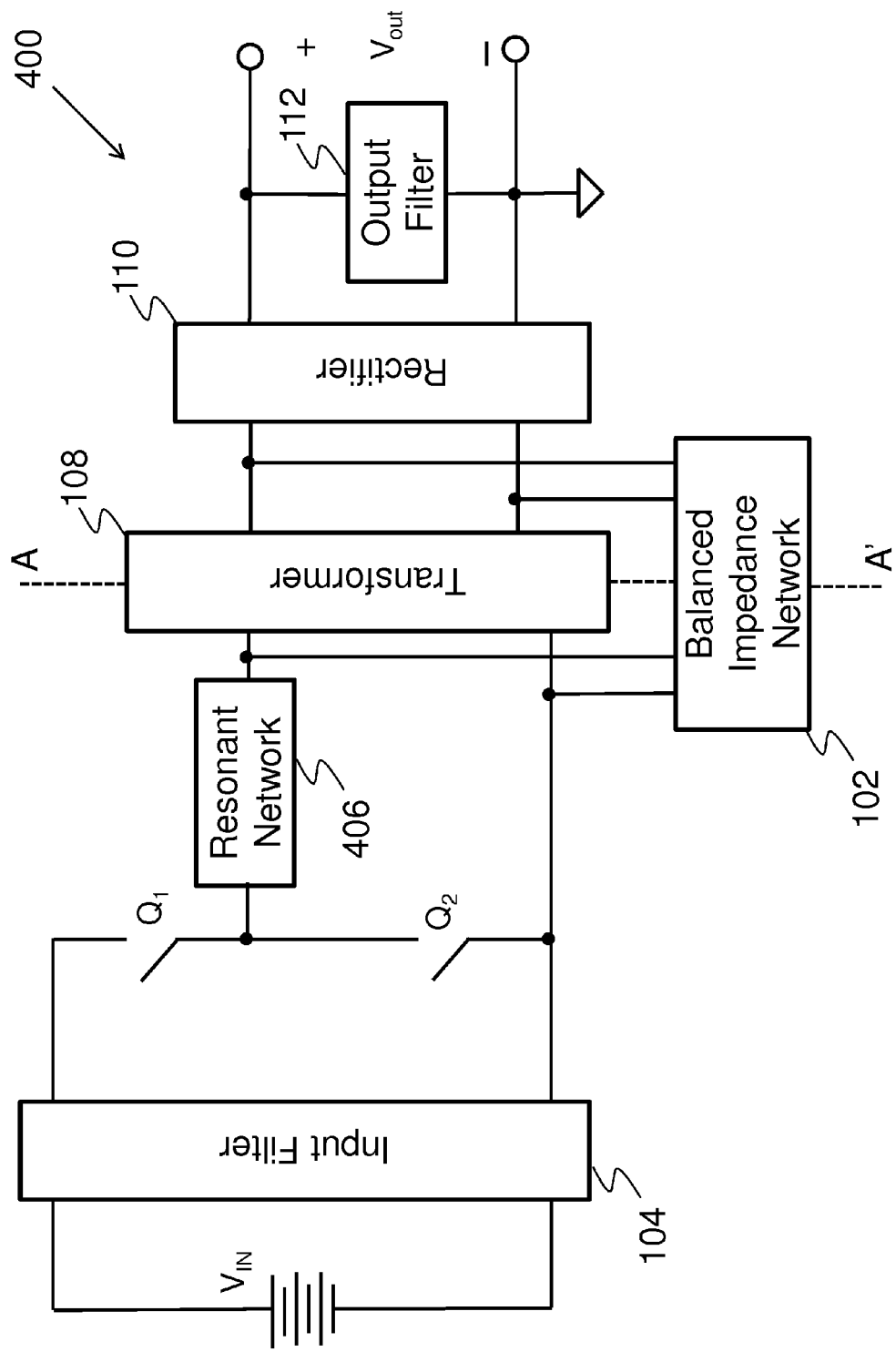
FIG. 4 illustrates a block diagram of an LLC resonant converter employing a balanced impedance network.

FIG. 4 illustrates a block diagram of an LLC resonant converter employing a balanced impedance network. FIG. 4 is similar to FIG. 1 except that the primary side network 106 shown in FIG. 1 is replaced by a first switch Q1, a second switch Q2 and a resonant tank 406. According to the operating principles of LLC resonant converters, the first switch Q1 and the second switch Q2 are driven alternately with 50% duty cycle for each switch. It should be noted that there may be a small dead time between the on and off transitions of the first switch Q1 and the second switch Q2. The resonant network 406 may comprise a capacitor and an inductor. The inductor of the resonant network 406 may be derived from the leakage inductance of the transformer 108. Alternatively, the inductor of the resonant network 406 may be implemented by using a separate inductor.

Figure 5:
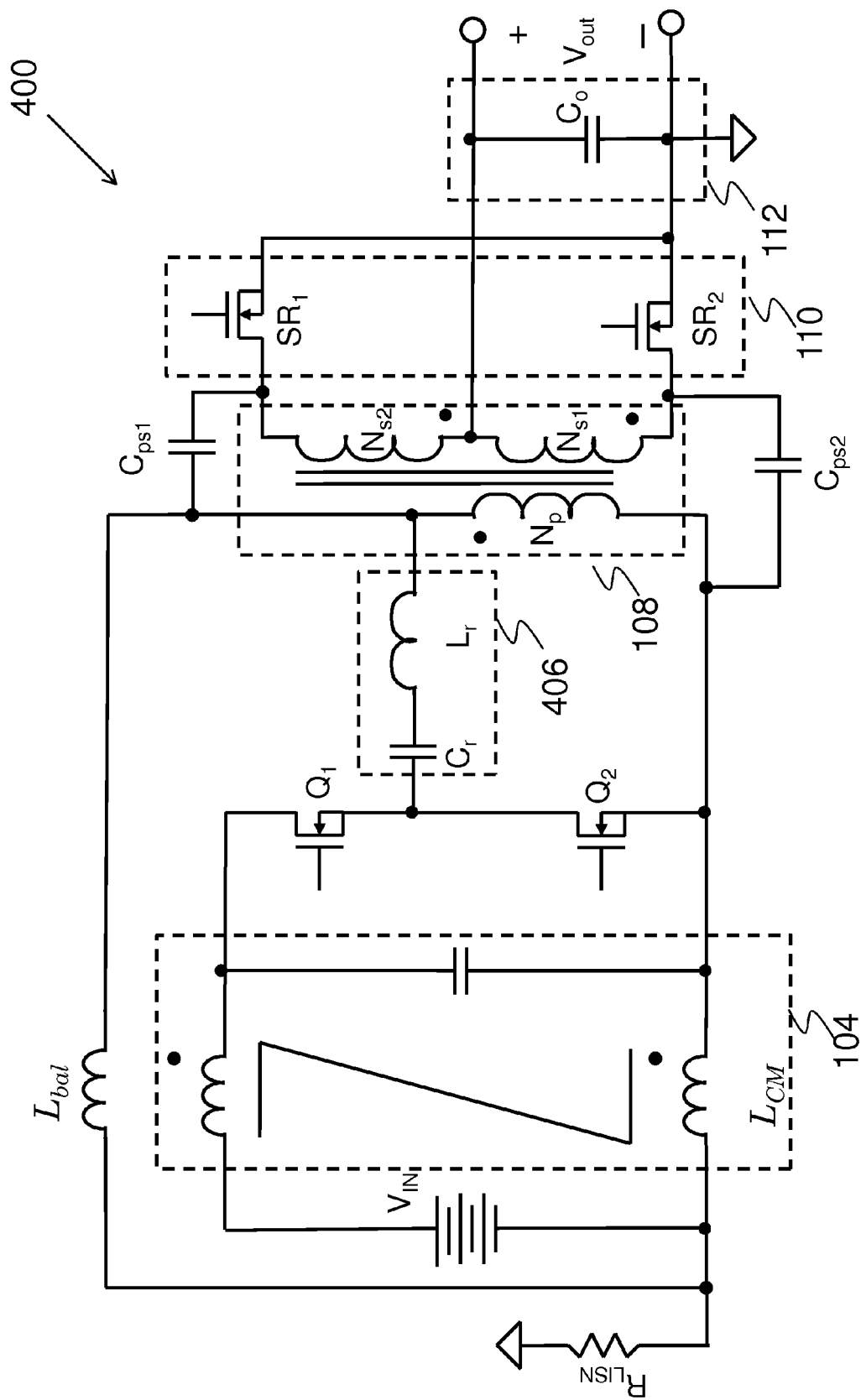
FIG. 5 illustrates a schematic diagram of an LLC resonant converter employing a balanced impedance network.

FIG. 5 illustrates a schematic diagram of an LLC resonant converter employing a balanced impedance network. As shown in FIG. 5, a balance inductor $L_{bal}$ is placed between an upper terminal of the primary winding $N_p$ of the transformer 108 and the negative terminal of the input dc source $V_{IN}$. $C_{ps1}$ and $C_{ps2}$ are derived from parasitic capacitors (e.g., inter-winding capacitors) of the transformer 108. As shown in FIG. 5, $C_{ps1}$ is equivalent to a capacitor coupled between the upper terminal of the primary winding $N_p$ and the upper terminal of second secondary winding $N_{s2}$. $C_{ps2}$ is equivalent to a capacitor coupled between the lower terminal of the primary winding Np and the lower terminal of first secondary winding $N_{s1}$. The equivalent impact of the input filter 104 may be simplified into a lumped inductor $L_{CM}$. In sum, the balance inductor $L_{bal}$, the parasitic capacitors $C_{ps1}$, $C_{ps2}$ and the lumped inductor $L_{CM}$ form a Wheatstone bridge.

Figure 6:
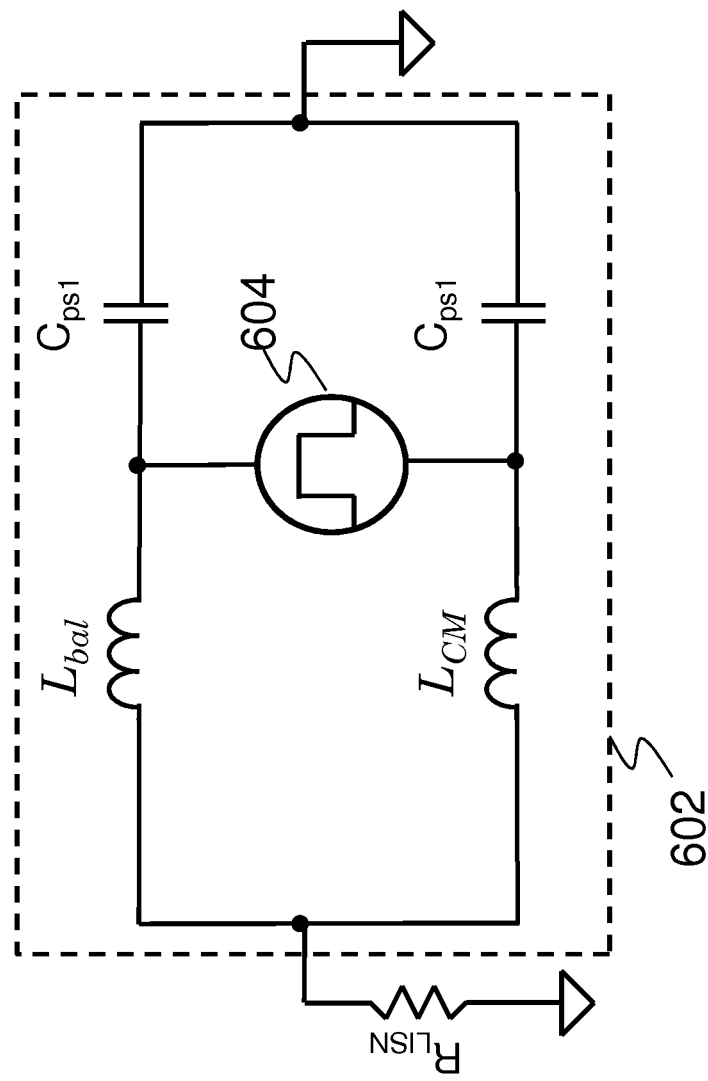
FIG. 6 illustrates an equivalent circuit of the circuit configuration shown in FIG. 5.

FIG. 6 illustrate an equivalent circuit of the circuit configuration shown in FIG. 5. The schematic diagram of FIG. 6 is similar to FIG. 3. The detailed operation principle of Wheatstone bridges have been discussed with respect to FIG. 3, and hence is not discussed in further detail herein. The equivalent circuit 602 is formed by four components, namely $L_{bal}$, $L_{CM}$, $C_{ps1}$ and $C_{ps2}$. Among them, $L_{CM}$, $C_{ps1}$ and $C_{ps2}$ may be fixed or less likely to be adjusted because they are related to the physical parameters of the transformer 108 and the input filter 104. In accordance with an embodiment, the value of the balance inductor $L_{bal}$ can be adjusted so as to satisfy that the ratio between $L_{bal}$ and $L_{CM}$ is approximately equal to the ratio between $C_{ps1}$ and $C_{ps2}$. As a result, the equivalent circuit 602 is a balanced Wheatstone bridge so that the common mode noise derived from the equivalent ac source 604 is attenuated to a level approximately equal to zero.

Figure 7:
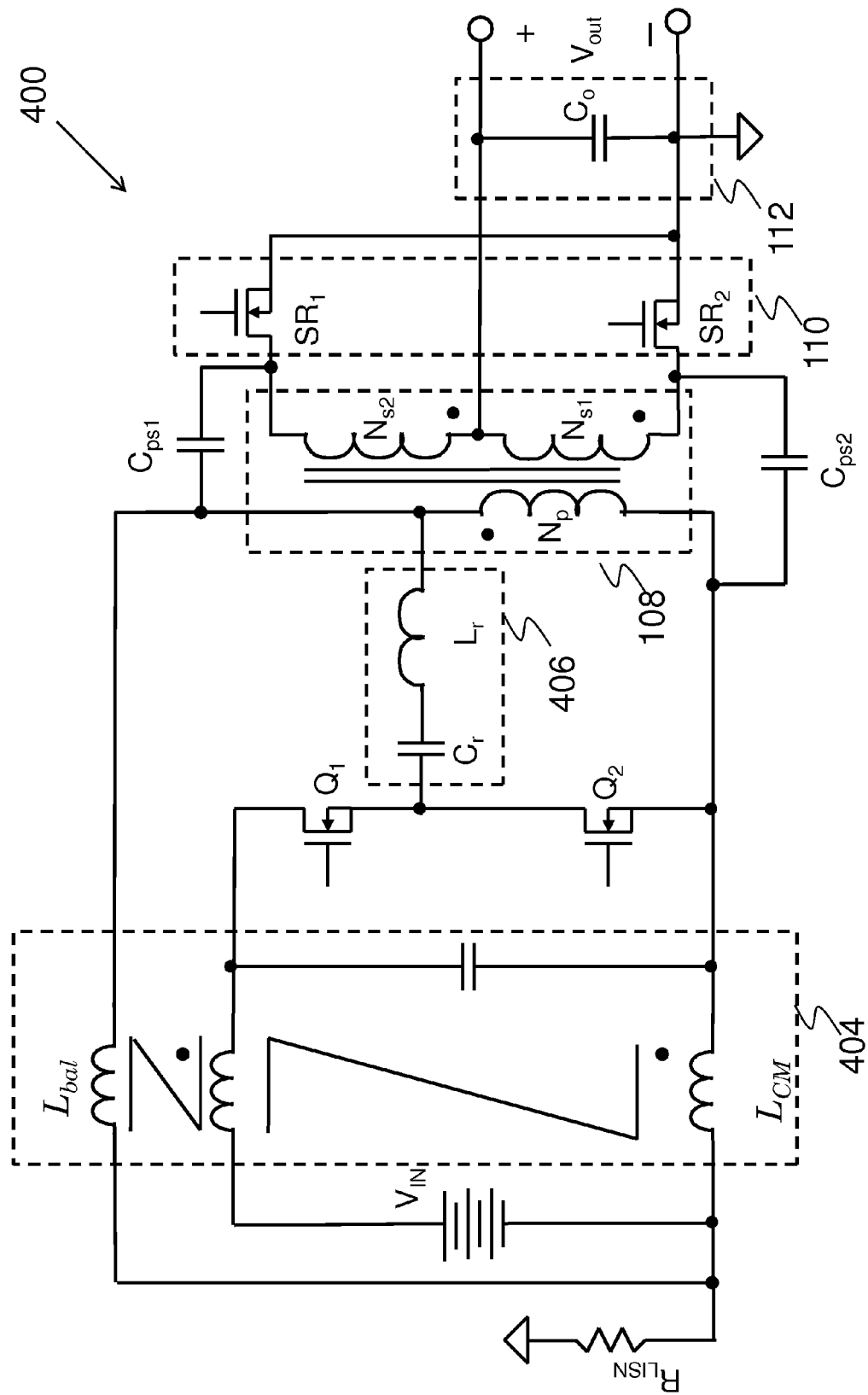
FIG. 7 illustrates a schematic diagram of an LLC resonant converter employing a balanced impedance network formed by a coupled inductor configuration.

FIG. 7 illustrates a schematic diagram of an LLC resonant converter employing a balanced impedance network formed by a coupled inductor configuration. As shown in FIG. 7, FIG. 7 is similar to FIG. 5 except that the balance inductor $L_{bal}$ is coupled with the common mode choke to form an integrated magnetic device 404. The structure and operation principle of integrated magnetic devices are well known in the art, and hence are not discussed in further detail. An advantageous feature of having an integrated magnetic device is that the physical size of the balanced impedance network can be further reduced by coupling the balance inductor $L_{bal}$ with the common mode choke. In addition, the balance inductor $L_{bal}$ does not carry any dc current. Therefore, the common mode choke and the balance inductor $L_{bal}$ can be magnetically coupled together by a small magnetic core (not shown).

Figure 8:
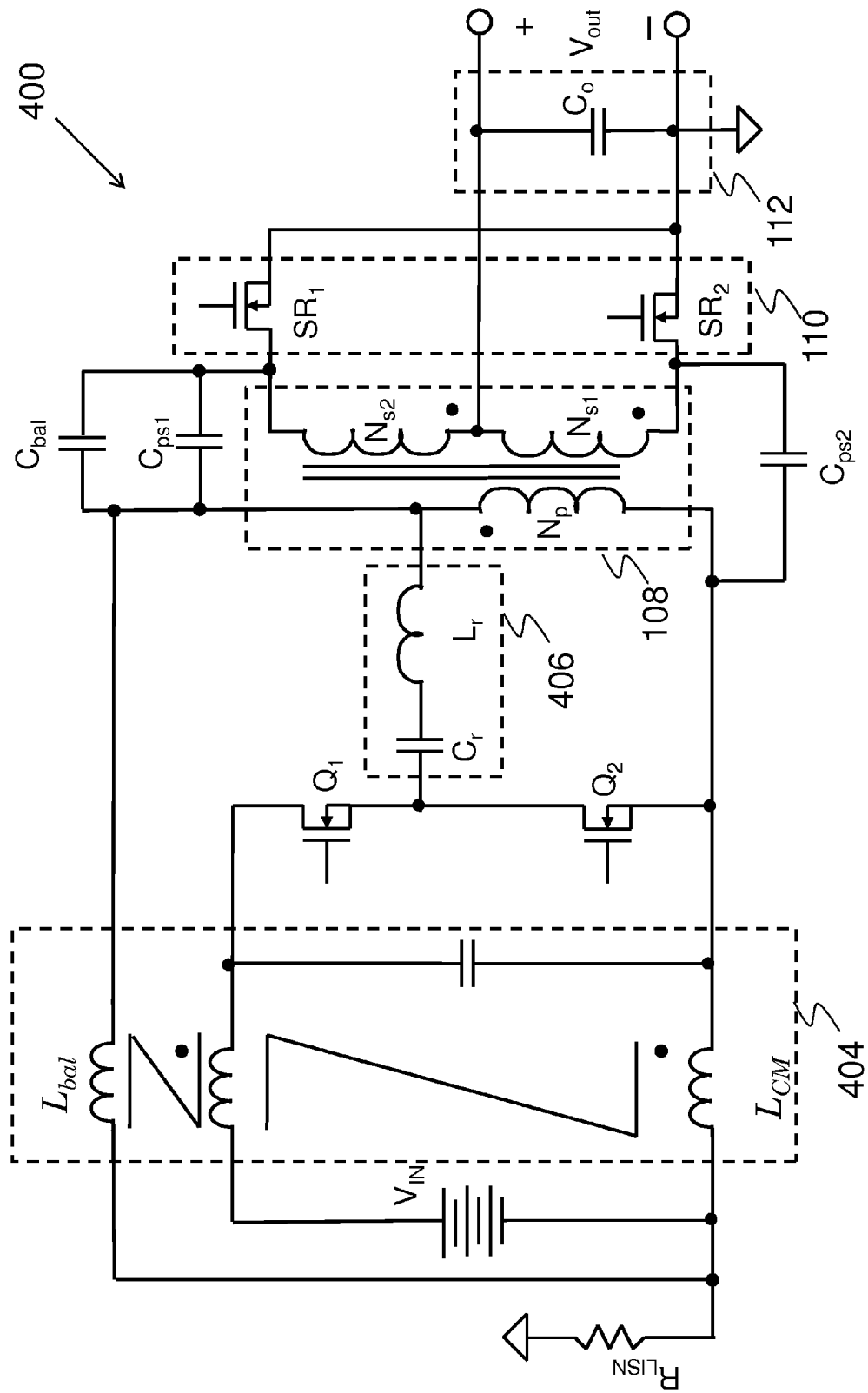
FIG. 8 illustrates a schematic diagram of an LLC resonant converter employing a balanced impedance network including a balance capacitor.

FIG. 8 illustrates a schematic diagram of an LLC resonant converter employing a balanced impedance network including a balance capacitor. FIG. 8 is similar to FIG. 7 except that a balance capacitor $C_{bal}$ is placed between the upper terminal of the primary side winding $N_p$ and the upper terminal of the second secondary side winding $N_{s2}$. As described above with respect to FIG. 6, the common mode noise voltage across the LISN resistor $R_{LISN}$ is approximately equal to zero if the ratio between $L_{bal}$ and $L_{CM}$ is approximately equal to the ratio between $C_{ps1}$ and $C_{ps2}$. However, the number of turns of $L_{bal}$ and the number of turns of $L_{CM}$ are in a limited range of small integer numbers. Therefore, in the integrated magnetic device 404, the ratio between $L_{bal}$ and $L_{CM}$ is too limited to match the ratio between $C_{ps1}$ and $C_{ps2}$.

The balance capacitor $C_{bal}$ is added to introduce a new variable. Such a new variable allows the balance impedance network to achieve a balanced Wheatstone bridge. One skilled in the art will recognize that while FIG. 8 shows the balance capacitor $C_{bal}$ is added between the upper terminal of the primary side winding $N_p$ and the upper terminal of the second secondary side winding $N_{s2}$, the balance capacitor $C_{bal}$ can be placed between the lower terminal of the primary side winding $N_p$ and the lower terminal of the first secondary side winding $N_{s1}$.

Figure 9:
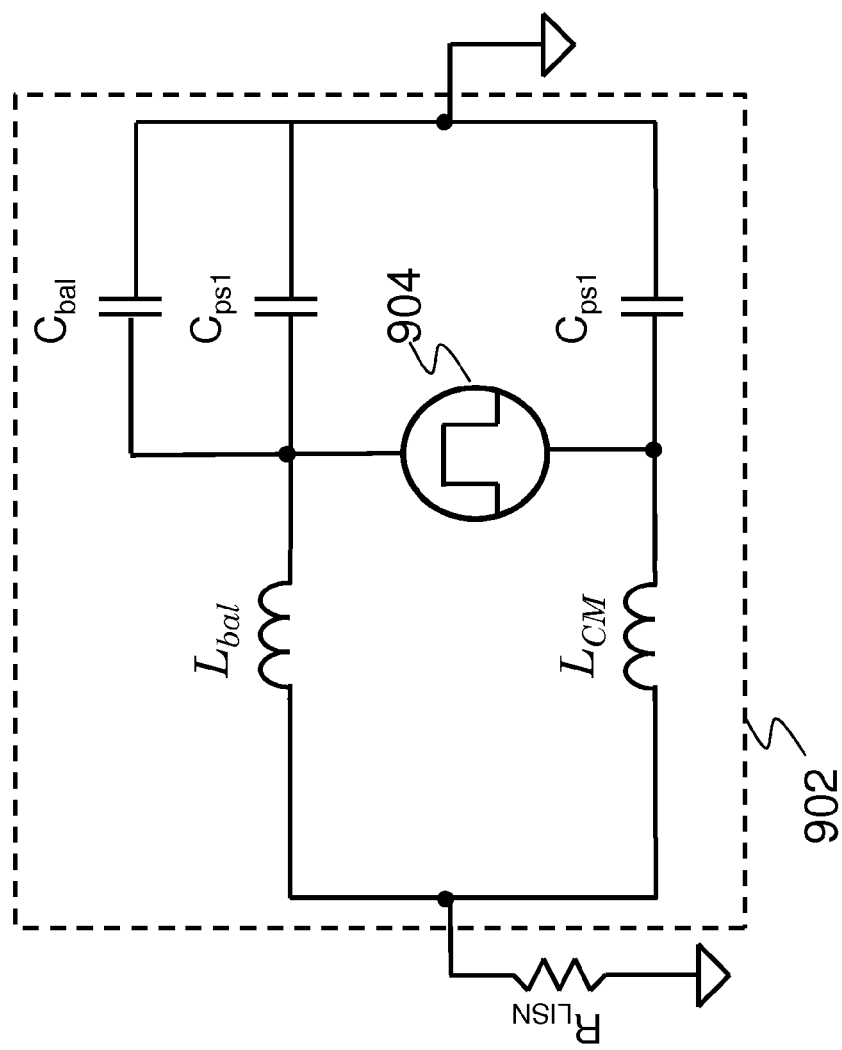
FIG. 9 illustrates an equivalent circuit of the circuit configuration shown in FIG. 8.

FIG. 9 illustrate an equivalent circuit of the circuit configuration shown in FIG. 8. The schematic diagram of FIG. 9 is similar to FIG. 6 except that a balanced capacitor $C_{bal}$ is connected with $C_{ps1}$ in parallel. The equivalent circuit 602 is formed by five components, namely $L_{bal}$, $L_{CM}$, $C_{ps1}$, $C_{bal}$ and $C_{ps2}$. Among them, $L_{CM}$, $L_{bal}$, $C_{ps1}$ and $C_{ps2}$ may be fixed or less likely to be adjusted because they are related to the physical parameters of the transformer 108 and the integrated magnetic device 404 (not shown but illustrated in FIG. 8). In accordance with an embodiment, the value of the balance capacitor $C_{bal}$ can be adjusted so as to achieve a balanced Wheatstone bridge. As a result, the common mode noise derived from the equivalent ac source 904 is attenuated to a level approximately equal to zero.

Figure 10:
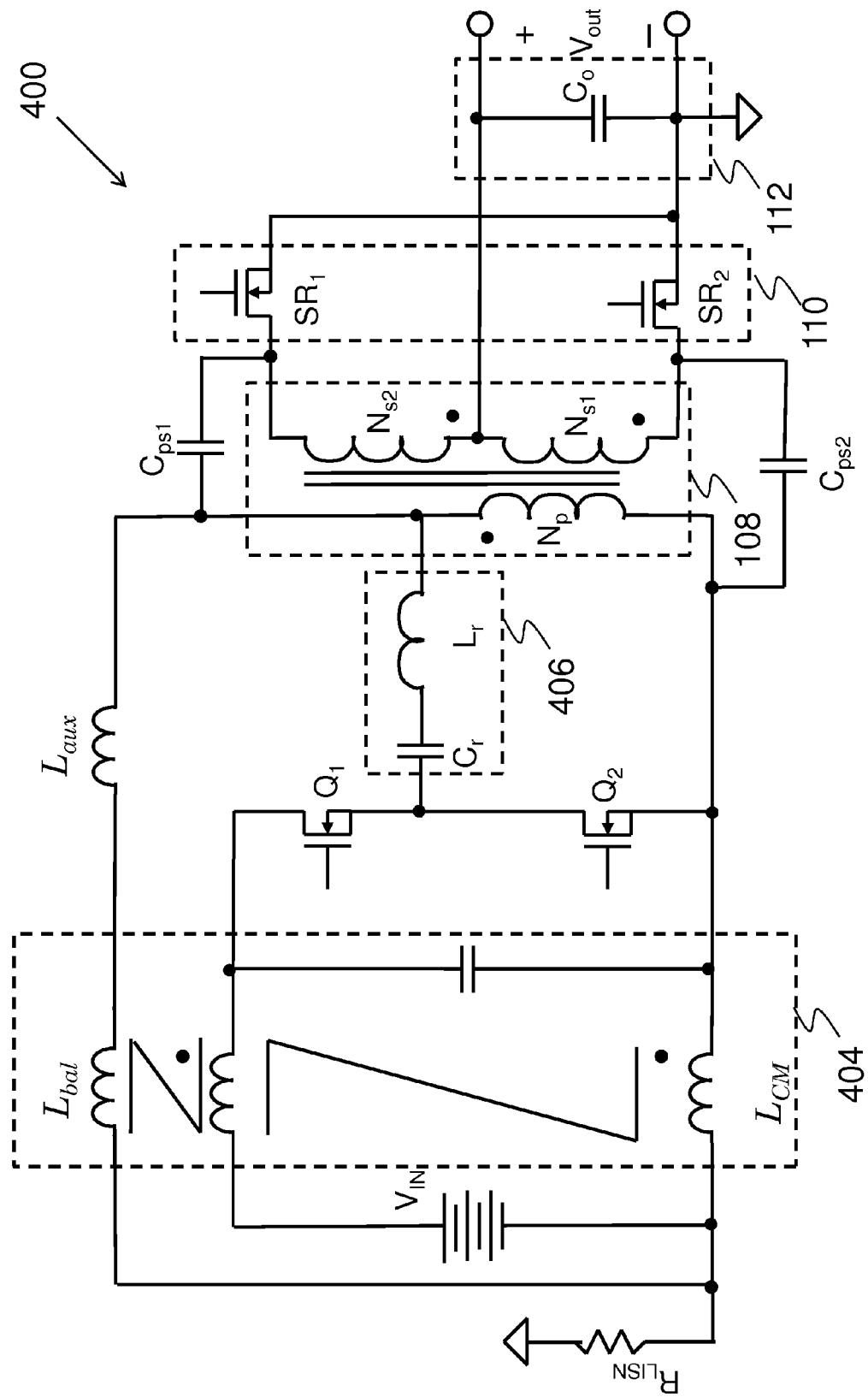
FIG. 10 illustrates a schematic diagram of an LLC resonant converter employing a balanced impedance network including an auxiliary inductor.

FIG. 10 illustrates a schematic diagram of an LLC resonant converter employing a balanced impedance network including an auxiliary inductor. FIG. 10 is similar to FIG. 7 except that an auxiliary inductor $L_{aux}$ is placed between the upper terminal of the primary side winding $N_p$ and the balance inductor $L_{bal}$. As described above with respect to FIG. 8, the mismatch between the ratios of the balance impedance network can be compensated by adding the auxiliary inductor $L_{aux}$. By adjusting the value of the auxiliary inductor Laux, a balanced Wheatstone bridge can be achieved so that the common mode noise voltage across the LISN resistor $R_{LISN}$ is approximately equal to zero.

Figure 11:
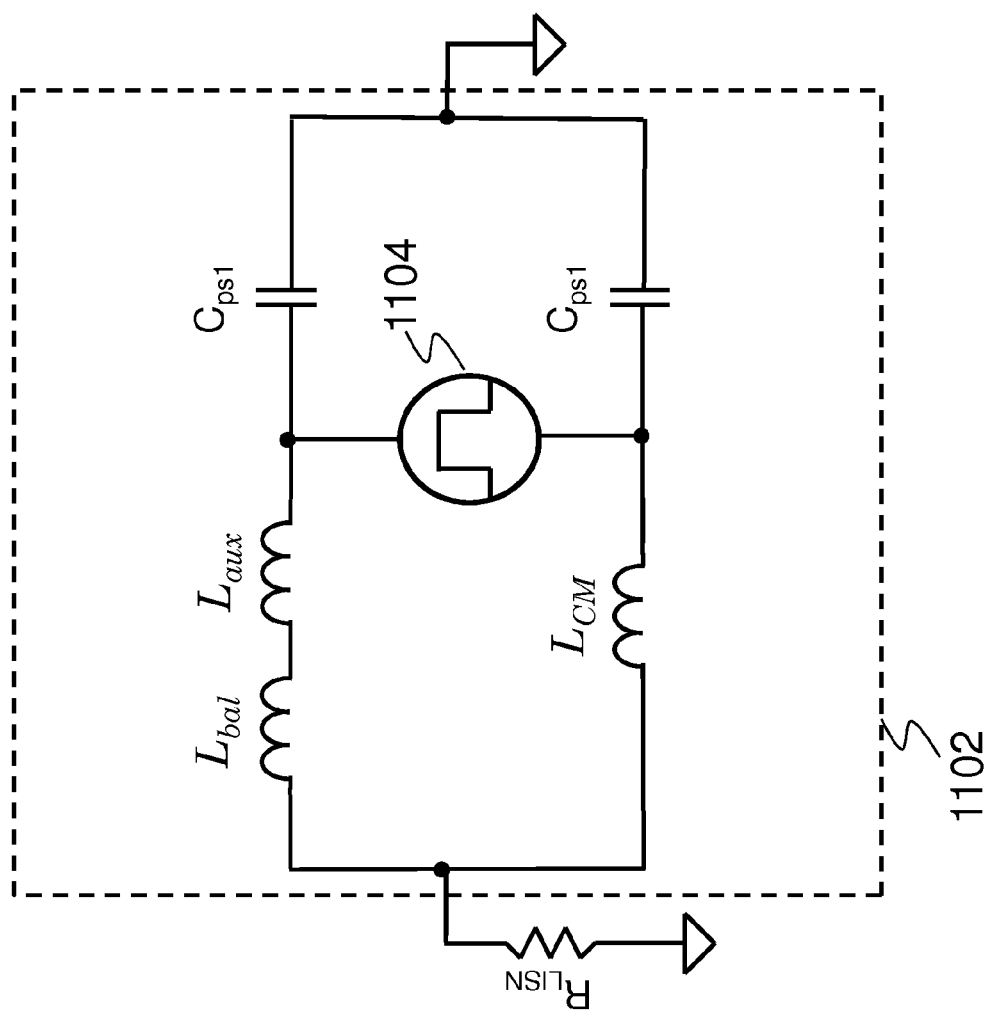
FIG. 11 illustrates an equivalent circuit of the circuit configuration shown in FIG. 10.

FIG. 11 illustrate an equivalent circuit of the circuit configuration shown in FIG. 10. The schematic diagram of FIG. 11 is similar to FIG. 6 except that an auxiliary inductor $L_{aux}$ is connected with $L_{bal}$ in series. The equivalent circuit 1102 is formed by five components, namely $L_{bal}$, $L_{aux}$, $L_{CM}$, $C_{ps1}$, and $C_{ps2}$. Among them, $L_{CM}$, $L_{bal}$, $C_{ps1}$ and $C_{ps2}$ may be fixed or less likely to be adjusted because they are related to the physical parameters of the transformer 108 and the integrated magnetic device 404 (not shown but illustrated in FIG. 10). In accordance with an embodiment, the value of the auxiliary inductor $L_{aux}$ can be adjusted so as to achieve a balanced Wheatstone bridge. As a result, the common mode noise derived from the equivalent ac source 1104 is attenuated to a level approximately equal to zero.

Figure 12:
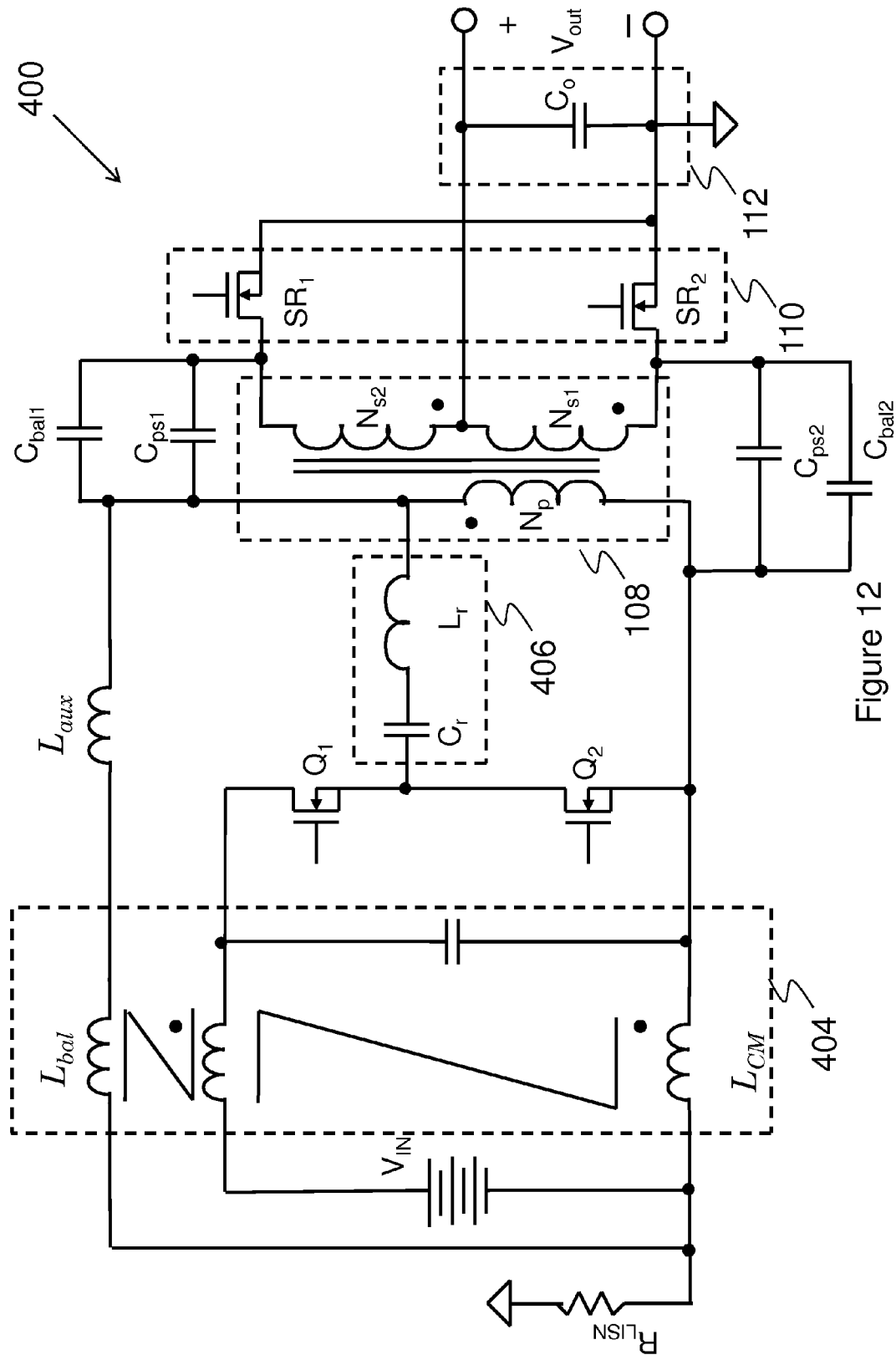
FIG. 12 illustrates a schematic diagram of an LLC resonant converter employing a balanced impedance network including an auxiliary inductor and two balance capacitors.

FIG. 12 illustrates a schematic diagram of an LLC resonant converter employing a balanced impedance network including an auxiliary inductor and two balance capacitors. FIG. 12 is similar to FIG. 7 except that an auxiliary inductor $L_{aux}$, a first balance capacitor $C_{bal1}$ and a second balance capacitor $C_{bal2}$ are added into the balanced impedance network. More particularly, the auxiliary inductor $L_{aux}$ is placed between the upper terminal of the primary side winding $N_p$ and the balance inductor $L_{bal}$. The first balance capacitor $C_{bal1}$ is placed between the upper terminal of the primary side winding $N_p$ and the upper terminal of the second secondary side winding $N_{s2}$. The second balance capacitor $C_{bal2}$ is placed between the lower terminal of the primary side winding $N_p$ and the lower terminal of the first secondary side winding $N_{s1}$.

The mismatch between the ratios of the balance impedance network can be compensated by adjusting the values of the auxiliary inductor $L_{aux}$, the first balance capacitor $C_{bal1}$ and the second balance capacitor $C_{bal2}$. A person skilled in the art will recognize that balanced impedance network shown in FIG. 12 provides multiple variables. Such multiple variables can be adjusted individually or as a whole so as to achieve a balanced Wheatstone bridge. As a result, the common mode noise voltage across the LISN resistor $R_{LISN}$ is approximately equal to zero.

Figure 13:
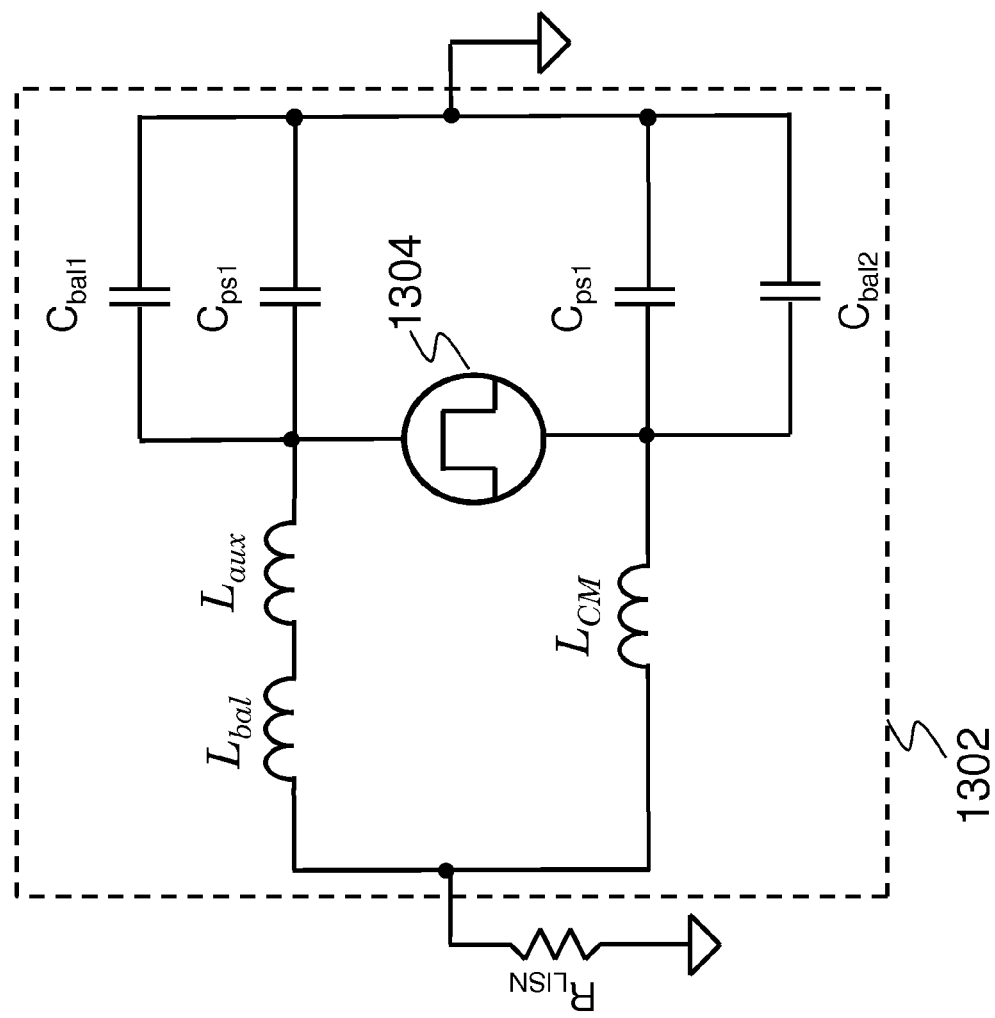
FIG. 13 illustrates an equivalent circuit of the circuit configuration shown in FIG. 12.

FIG. 13 illustrate an equivalent circuit of the circuit configuration shown in FIG. 12. The schematic diagram of FIG. 13 is similar to FIG. 6 except that an auxiliary inductor $L_{aux}$, a first balance capacitor $C_{bal1}$ and a second balance capacitor $C_{bal2}$ are added into the equivalent circuit 1302. The auxiliary inductor $L_{aux}$ is connected with $L_{bal}$ in series. The first balance capacitor $C_{bal1}$ is connected with $C_{ps1}$ in parallel. Likewise, the second balance capacitor $C_{bal2}$ is connected with $C_{ps2}$ in parallel. The equivalent circuit 1302 is formed by seven components, namely $L_{bal}$, $L_{aux}$, $L_{CM}$, $C_{ps1}$, $C_{bal1}$, $C_{bal2}$ and $C_{ps2}$. Among them, $L_{CM}$, $L_{bal}$, $C_{ps1}$ and $C_{ps2}$ may be fixed or less likely to be changed because they are related to the physical parameters of the transformer 108 and the integrated magnetic device 404 (illustrated in FIG. 12). In accordance with an embodiment, the values of the auxiliary inductor $L_{aux}$, the first balance capacitor $C_{bal1}$ and the second balance capacitor $C_{bal2}$ can be adjusted individually or as a group so as to achieve a balanced Wheatstone bridge. As a result, the common mode noise derived from the equivalent ac source 1304 is attenuated to a level approximately equal to zero.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
    a common mode choke disposed between an input dc source and a primary side network of an isolated power converter;
    a balance inductor coupled between an upper terminal of a primary winding of the isolated power converter and a negative terminal of the input dc source;
    a first capacitor coupled between the upper terminal of a primary side of a transformer and an upper terminal of a secondary side of the transformer of the isolated power converter; and
    a second capacitor coupled between a lower terminal of the primary side of the transformer and a lower terminal of the secondary side of the transformer of the isolated power converter.

2. The apparatus of claim 1, wherein
    the first capacitor is a first lumped inter-winding capacitor of the transformer; and
    the second capacitor is a second lumped inter-winding capacitor of the transformer.

3. The apparatus of claim 1, wherein the balance inductor is coupled with the common mode choke to form an integrated magnetic device.

4. The apparatus of claim 1, further comprising a first balance capacitor connected in parallel with the first capacitor.

5. The apparatus of claim 1, further comprising a second balance capacitor connected in parallel with the second capacitor.

6. The apparatus of claim 1, further comprising an auxiliary inductor coupled between the primary side of the transformer and the balance inductor.

7. The apparatus of claim 1, wherein the isolated converter is an LLC resonant converter.

8. A system comprising:
    an isolated power converter comprising a primary side network coupled to an input dc source;
        a transformer coupled to the primary side network;
        a rectifier coupled to a secondary side of the transformer; and
        an output filter coupled to the rectifier; and
    a balanced impedance network comprising
        a common mode choke disposed between the input dc source and the primary side network of the isolated power converter;
        a balance inductor coupled between an upper terminal of a primary side of the transformer of the isolated power converter and a negative terminal of the input dc source;
        a first capacitor coupled between the upper terminal of the primary side of the transformer and an upper terminal of the secondary side of the transformer of the isolated power converter; and
        a second capacitor coupled between a lower terminal of the primary side of the transformer and a lower terminal of the secondary side of the transformer of the isolated power converter.

9. The system of claim 8, further comprising an integrated magnetic device formed by the common mode choke and the balance inductor.

10. The system of claim 8, wherein an inductance ratio between the balance inductor and the common mode choke is equal to a capacitance ratio between the first capacitor and the second capacitor.

11. The system of claim 8, further comprising an auxiliary inductor disposed between the primary side of the transformer and the balance inductor, wherein a sum of the balance inductor and the auxiliary inductor is configured such that an inductance ratio between the sum and the common mode choke is equal to a capacitance ratio between the first capacitor and the second capacitor.

12. The system of claim 8, further comprising a first balance capacitor connected in parallel with the first capacitor, wherein a sum of the first balance capacitor and the first capacitor is configured such that an inductance ratio between the balance inductor and the common mode choke is equal to a capacitance ratio between the sum and the second capacitor.

13. The system of claim 8, further comprising a second balance capacitor connected in parallel with the second capacitor, wherein a sum of the second balance capacitor and the second capacitor is configured such that an inductance ratio between the balance inductor and the common mode choke is equal to a capacitance ratio between the first capacitor and the sum.

14. The system of claim 8, wherein the isolated converter is an LLC resonant converter comprising:
    a pair of switches connected in series;
    a primary side winding coupled to the pair of switches; and
    a secondary winding magnetically coupled to the primary side winding.

15. The system of claim 14, wherein the secondary winding is a center-tapped winding.

16. A method comprising:
    determining a first capacitance value of a first parasitic capacitor coupled between an upper terminal of a primary side of a transformer and an upper terminal of a secondary side of the transformer of an isolated power converter;
    determining a second capacitance value of a second parasitic capacitor coupled between a lower terminal of the primary side of the transformer and a lower terminal of the secondary side of the transformer of the isolated power converter;
    determining a inductance value of a common mode choke coupled between the primary side of the transformer and an input dc source; and
    coupling a balance inductor between the upper terminal of the primary side of the transformer and a negative terminal of the input dc source, wherein an inductance value of the balance inductor is configured such that a ratio between the inductance value of the balance inductor and the inductance value of the common mode choke is equal to a ratio between the first capacitance value and the second capacitance value.

17. The method of claim 16, further comprising:
coupling a first balance capacitor connected in parallel with the first parasitic capacitor.

18. The method of claim 16, further comprising:
coupling a second balance capacitor connected in parallel with the second parasitic capacitor.

19. The method of claim 16, further comprising:
coupling an auxiliary inductor between the upper terminal of the primary side of the transformer and the balance inductor.

20. The method of claim 16, further comprising:
coupling the balance inductor with the common mode choke to form an integrated magnetic device.

\* \* \* \* \*